July 9, 1940. B. C. HASKIN 2,206,953
PICTURE PROJECTOR
Original Filed April 11, 1938 4 Sheets-Sheet 2
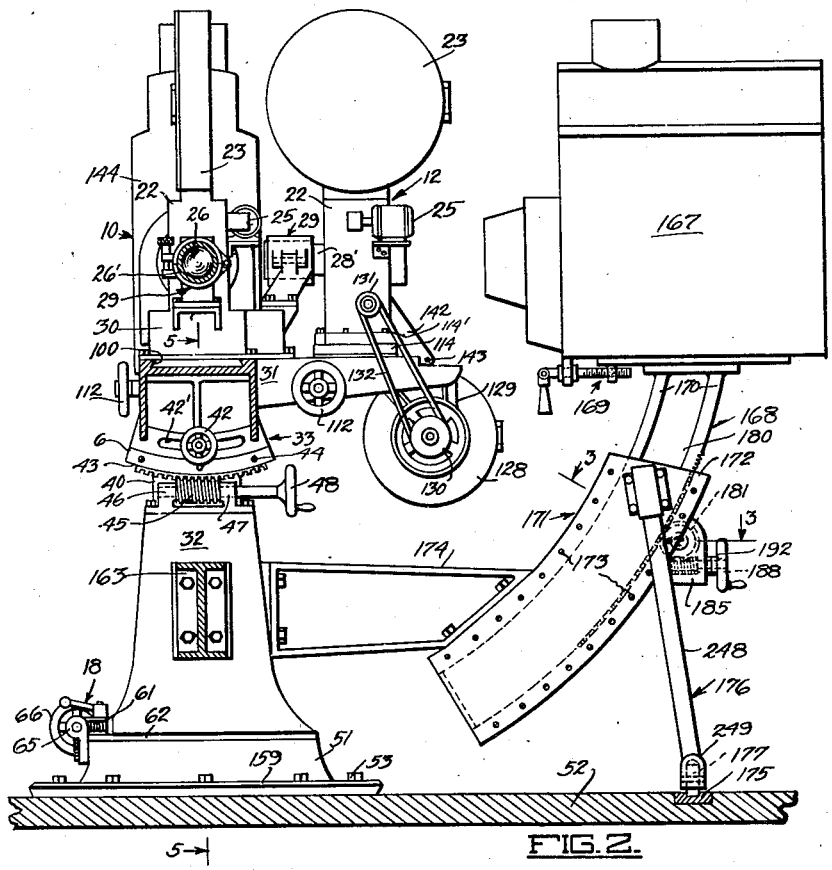
FIG. 2.
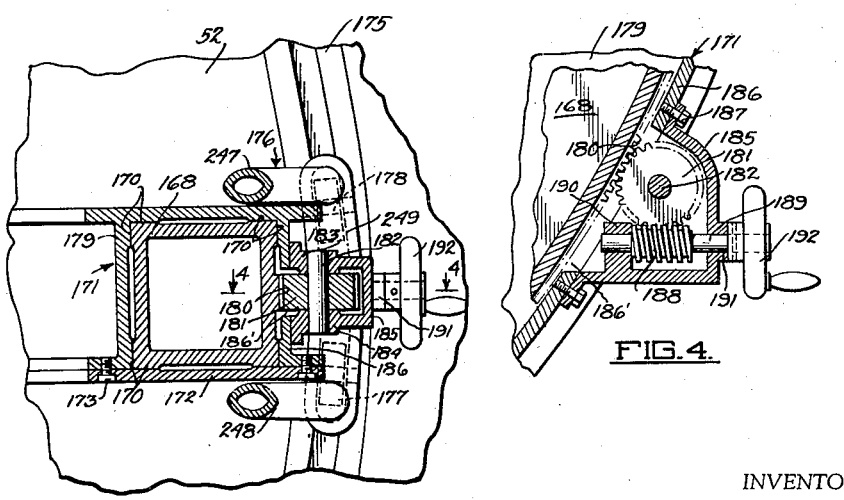
FIG. 3.
FIG. 4.
INVENTOR.
BYRON C. HASKIN
BY W. H. Beath
ATTORNEY.

July 9, 1940.   B. C. HASKIN   2,206,953
PICTURE PROJECTOR
Original Filed April 11, 1938   4 Sheets-Sheet 4

INVENTOR.
BYRON C. HASKIN
BY
ATTORNEY.

Patented July 9, 1940

2,206,953

UNITED STATES PATENT OFFICE 2,206,953

PICTURE PROJECTOR

Byron C. Haskin, Beverly Hills, Calif., assignor to Warner Bros. Pictures, Inc., New York, N. Y., a corporation of Delaware Original application April 11, 1938, Serial No. 201,372. Divided and this application October 8, 1938, Serial No. 233,972

4 Claims. (Cl. 88—17)

This invention relates to picture projectors and has for an object to facilitate adjustment of a picture projector to cause a picture image projected thereby to embrace a given area on a screen and to be in focus.

Another object is to prevent a keystone or distorted effect of a picture projected on a screen at an angle.

Another object is to reduce the transmission of vibration from the film driving elements in a motion picture projector to the objective lens therefor.

The invention provides a means for rigidly supporting the objective lens of a projector independently of the body of the projector while permitting movement of the projector body toward and away from the lens for focussing. With this arrangement the adjustment of the projector to cause the image projected thereby to assume a given size on a screen is facilitated since the magnification of the projected image is determined by the distance between the lens and the screen. Having correctly positioned the lens relative to the screen, it is a simple matter to move the projector body toward or away from the lens until the image is in sharp focus on the screen.

The invention further permits reduction of the well known keystone or distorted effect due to the projection of a picture at an angle upon a screen surface by the provision of means for angularly adjusting the projector body containing the film to be projected relative to the objective lens therefor while maintaining the lens in a fixed position relative to the screen. By causing the axis, about which the projector body is angularly movable, to pass centrally of the film and in the plane of the emulsion surface of the film, no image sweep will result when the projector is adjusted for keystone.

Another feature of the invention lies in the provision of means for supporting the objective lens of a moving picture projector independently of the projector body thereof, thereby to reduce the tendency of any vibrations generated by the various film driving elements in the projector body from being transmitted to the objective lens with consequent vibration of the picture image projected on the screen.

All of the above features are of especial importance in the case where a plurality of projectors are arranged to project identical superposed pictures on a screen for the purpose of increasing the brilliancy and/or the magnification of a picture as disclosed and claimed in the co-pending application of Byron C. Haskin, Serial No. 201,372, filed April 11, 1938, now Patent No. 2,198,815, April 30, 1940, for Composite photography, of which this application is a division. In that case even a slight relative vibration or misalignment between the superposed images is objectionable since it causes the resultant or composite picture appearing on the screen to lose its sharpness and, in the case of color pictures, may cause a color fringe to appear in the projected picture.

The manner in which the above and other objects of the invention are accomplished will be readily understood on reference to the following specification read in conjunction with the accompanying drawings wherein:

Fig. 2 is a sectional elevational view taken along the line 2—2 of Fig. 1.

Fig. 3 is a sectional plan view through the support for the rear projector lamp house and is taken along the line 3—3 of Fig. 2.

Fig. 4 is a fragmentary sectional view of the rear projector lamp house adjustment and is taken along the line 4—4 of Fig. 3.

Figure 1:
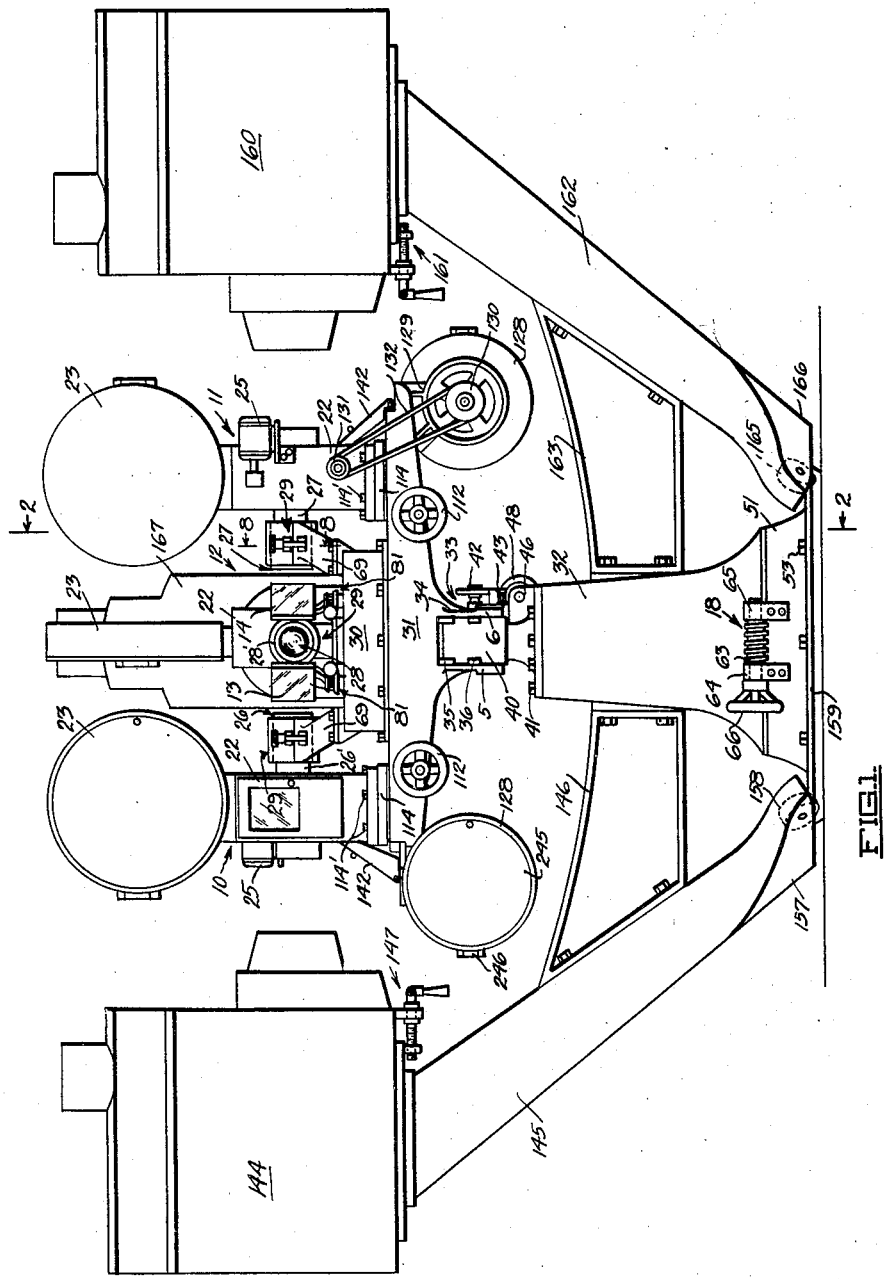
Fig. 1 is a front elevational view of a projector unit embodying the present invention.

Referring to Figs. 1 and 2 in particular, the apparatus comprises generally a pair of opposed motion picture projectors 10 and 11 having their optical axes in alignment with each other. A third projector 12 is situated at right angles to both of the projectors 10 and 11 and has the optical axis thereof intersecting the optical axes of the opposed projectors. Mirrors 13 and 14 individual to the projectors 10 and 11, respectively, are provided to deflect the light beams therefrom in a direction substantially parallel to the light beam emitted by the projector 12. These mirrors 13 and 14 are preferably so adjusted that the light beams deflected thereby intersect each other and the light beam from the projector 12 at a screen surface so as to produce, when identical films are employed in the projectors 10, 11 and 12, a single picture with substantially three times the brilliancy of that obtainable from any one projector.

The projectors 10, 11 and 12 are identical with each other, each comprising generally a projector body 22, a film supply magazine 23 thereon, and a motor 25 for driving the various film actuating mechanisms therein. Objective lenses 26, 27 and 28 mounted in lens tubes 26', 27' and 28', respectively, for the projectors 10, 11 and 12, respectively, are supported independently of those projectors by three lens mounts 29 mounted on a casting 30. These lenses are optically matched with each other to permit equal magnification of the three projected images and to permit ready interchangeability without correcting various adjustments. Casting 30 is secured on top of a T-shaped projector bed or base 31, also forming a support for the various projectors. Projector bed 31 is supported upon a pedestal 32 for movement about a tilt axis passing through the centers of mirrors 13 and 14 which, incidentally, coincides with the aligned optical axes of the projectors 10 and 11 through a bearing assembly, generally indicated at 33. The bed 31 has a depending saddle 34 (Figs. 5 and 6) formed centrally thereof. Each leg 5 and 6 of the saddle 34 has a pair of segmental bearing strips 35 and 36 secured to the inner surface thereof by screws 37. These bearing strips are each concentric with the above described tilt axis and are received within arcuate bearing grooves 38 and 39 also concentric with the optical axes of projectors 10 and 11. These grooves 38 and 39 are formed in a head casting 40 secured by bolts 41 to the top of the pedestal 32. A lock screw 42 extends through an arcuate slot 42', concentric with the strips 35 and 36, in the leg 6 of the saddle formation 34 and is threaded in the head casting 40 to clamp the projector bed 31 in different tilted positions. A worm gear segment 43, concentric with the above described tilt axis is secured to the saddle leg 6 by bolts 44. Worm gear segment 43 meshes with a worm 45 rotatably carried in bearings 46 and 47 (Fig. 2) integrally formed on the head casting 40. A hand wheel 48 is provided to rotate the worm 45 to tilt the projector bed 31 and projectors thereon.

Pedestal 32 has an annular bearing surface 49 formed on the bottom thereof which is received on a corresponding bearing surface 50 formed on a main base 51 to permit rotation of the pedestal 32 and bed 31 about a vertical axis intersecting the intersection of the optical axes of projectors 10, 11 and 12. The base 51 is secured to a floor 52 by bolts 53. A tubular column 54 extending axially of the pedestal 32 is secured at its lower end within a hollow boss 55 formed centrally in the base 51. Column 54 extends through bearings 56 and 57 supported within the pedestal 32 by radially extending flanges 58. The upper end of the column 54 is threaded to receive retainer nuts 59 to hold the pedestal 32 on the base 51 while permitting relative rotation therebetween.

An adjustment generally indicated at 18 (Figs. 1 and 2), is provided for rotating the pedestal 32 on the base 51. This adjustment comprises a worm gear segment 61 suitably secured by bolts (not shown) on a flange 62 formed on the base of the pedestal 32. The worm gear segment 61 is concentric with the axis of rotation of the pedestal 32 and meshes with a worm 63 rotatably supported in spaced bearings 64 and 65 suitably secured to the base 51. A hand wheel 66 is provided to rotate the worm 63.

Figure 8:
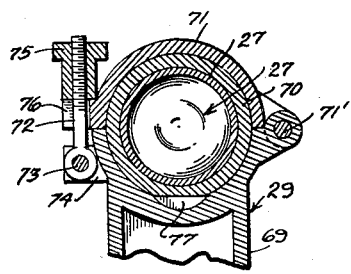
Fig. 8 is a transverse sectional view through one of the objective lens mounts and is taken along the line 8—8 of Fig. 1.

Referring now to Fig. 8 the objective lens mount 29 for each of the three projectors comprises a bracket 69 rigidly secured to the casting 30. The upper end of the bracket 69 is formed into a semi-circular lens receiving surface to receive the lower half of a sleeve 70 carrying lens tube 27' in which the various elements of the objective lens 27 are mounted. A semi-circular cover 71 is hinged at 71' to the bracket 69 and is adapted to clamp the sleeve 70 and its lens tube 27' in fixed position by means of a clamp screw 72. Screw 72 is pivotally secured at one end thereof to a pin 73 extending between a pair of spaced lugs 74 formed integrally with the bracket 69. A nut 75 threaded on the upper end of the screw 72 is adapted to bear against a pair of spaced lugs 76 on the cover 71 thus holding the cover in a clamped position. A key 77 carried by the bracket 69 and projecting into the semi-circular groove formed in the bracket 69 is provided to engage a corresponding notch in the sleeve 70 to facilitate correct positioning of the objective lens.

Figure 5:
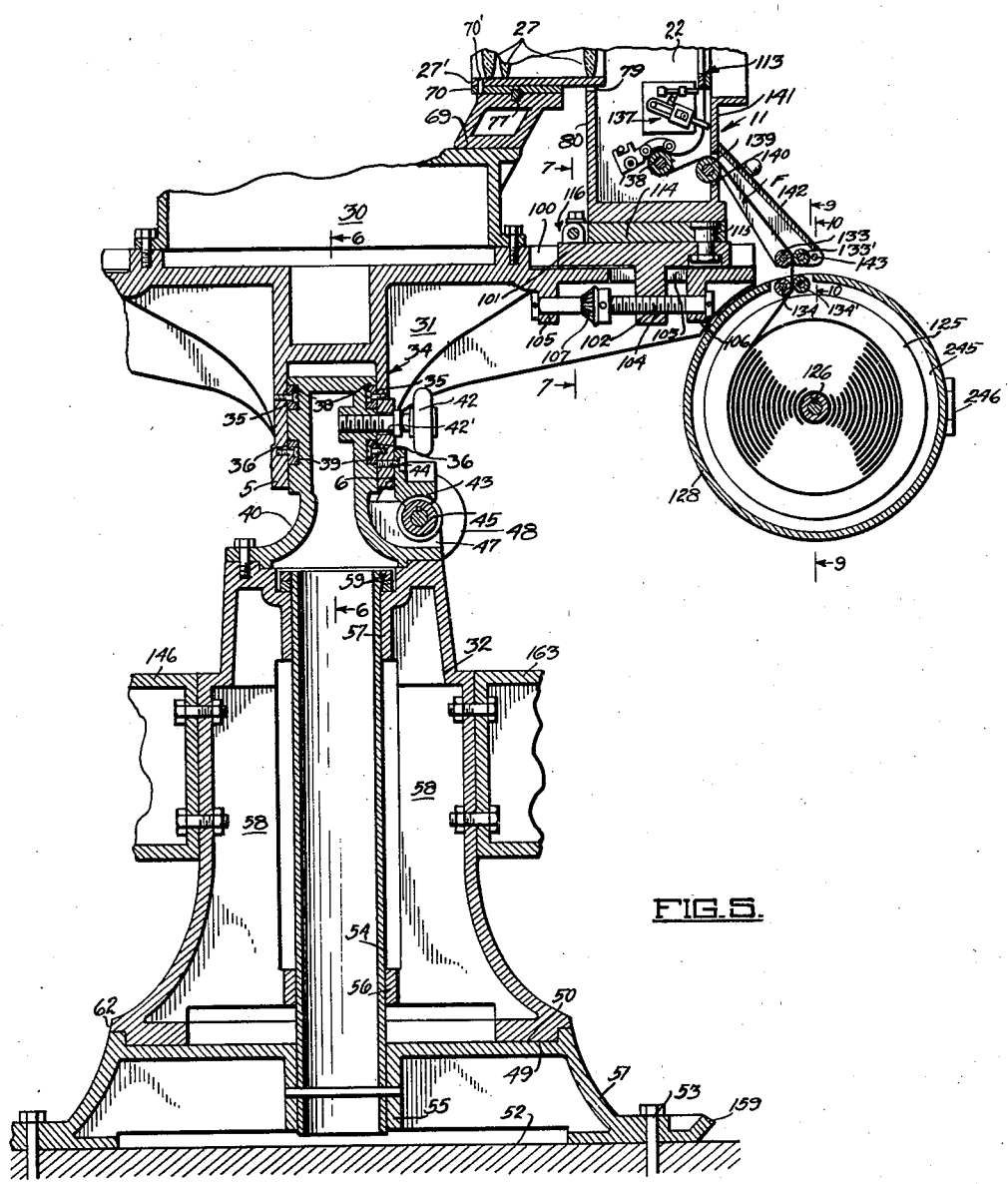
Fig. 5 is a sectional elevational view, with parts broken away, and is taken along the line 5—5 of Fig. 2.
Figure 6:
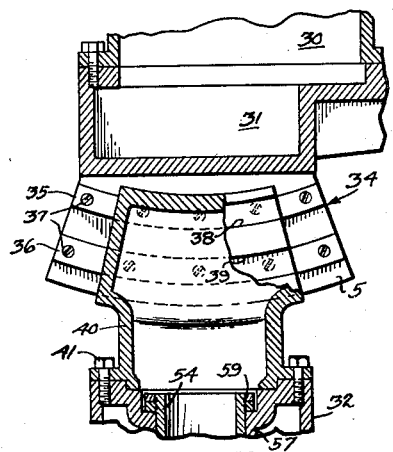
Fig. 6 is a sectional view taken along the line 6—6 of Fig. 5.

As shown in Fig. 5 the lens tube 27' is locked against longitudinal movement in the sleeve 70 by a dowel pin 70'. The other lens tubes are similarly locked in these respective sleeves 70.

In the original adjustment of the various objective lenses 26, 27 and 28, prior to the insertion of the dowel pins 70', each of the lens tubes 26', 27' and 28' is slid along its respective sleeve 70 until equal magnification is obtained for all lenses. The dowel pins 70' are thereafter passed through the lens tubes and their respective sleeves 70 to permanently retain the same in their correctly adjusted positions. Thereafter the magnification of all the lenses 26, 27 and 28 will be uniform thus facilitating focussing adjustment.

As will be noted in Fig. 5 the objective lens tube 27' carrying the objective lens 27 of the projector 11 extends freely within an aperture 79 formed in the front wall 80 of the projector to permit projector 11 to be moved relatively to the fixed sleeve 70 for focusing purposes, without light leakage.

The above arrangement of the three projectors 10, 11 and 12 and their respective objective lenses 26, 27 and 28 provides a rigid support for all of the lenses without any metallic connection between the projector bodies 22 and their lenses and lens mounts except through the heavy base 31 and casting 30 which, due to their weight, are substantially free from any vibration. Furthermore, this arrangement permits focussing of the three projectors 10, 11 and 12 without disturbing their accurately aligned objective lenses.

The mirrors 13 and 14 are preferably of the front surface type such as obtained by employing highly polished "stellite" plates and are supported in adjustable mounts generally indicated at 81 whereby the mirrors may be adjusted about vertical axes to cause the projector light beams from the projectors 10 and 11 to be moved laterally with respect to the light beam from the projector 12.

Each of the three arms of the T-shaped bed 31 has a dovetailed guideway 100 (Figs. 5, 7 and 9) extending longitudinally thereon to slidably receive a slide 101. Slide 101 has a depending projection 102 integrally formed thereon which extends through an elongated slot 103 in the bed 31 and has threaded therethrough a screw 104. Screw 104 is journalled at either end thereof in bearings 105 and 106 depending from the base 31. A bevel gear 107 secured on the screw 104 meshes with a second bevel gear 108 carried on a shaft 109 journalled in bearings 110 and 111 depending from bed 31. A hand wheel 112 on the shaft 109 permits manual focusing adjustment of the projector.

Figure 7:
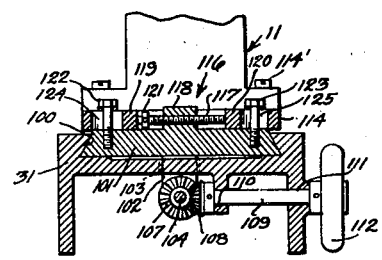
Fig. 7 is a sectional view through the pan adjustment of one of the projectors and is taken along the line 7—7 of Fig. 5.

Each projector is adjustable about a vertical axis passing through the center of the plane of the emulsion surface of the film in the film gate 113 (Fig. 5) thereof to compensate for any possible "keystone" effect of the projected images therefrom. A pad 114 secured to the bottom of each projector by screws 114' has a vertical pin 115 journalled therein and secured to the slide 101. Pin 115 is situated with the axis thereof passing centrally through the plane of the film F in the film gate 113 to permit movement of the projector therearound. The projector is movable about the pin 115 through an adjustment generally indicated at 116 (Fig. 7). This adjustment comprises a transversely extending screw 117 threaded within a projection 118 extending upwardly from the slide 101. Screw 117 abuts at either end thereof against a pair of spaced lugs 119 and 120 integrally formed on the projector pad 114. A turret 121 secured on the screw 117 is provided to permit manual rotation of the screw 117 for adjustment of the projector about the pin 115. Clamp screws 122 and 123 extend through elongated slots 124 and 125, respectively, in the pad 114 and are threaded in slide 101 to lock the pad 114 onto the slide 101. Slots 124 and 125 are formed concentric with pin 115.

Figure 9:
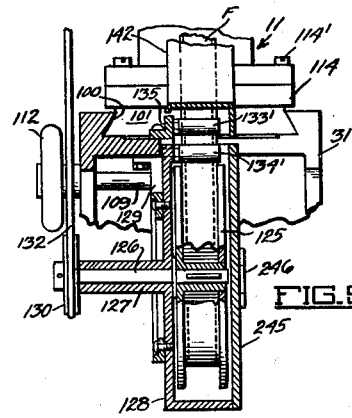
Fig. 9 is a sectional view through one of the take-up reel magazines and support therefor and is taken along the line 9—9 of Fig. 5.

Referring now to Figs. 5 and 9 the take-up reel 125 of each projector is supported by the bed 31 independently of its respective projector. The reel 125 is removably keyed on a spindle 126 journalled in a bearing 127 formed in a take-up magazine 128. Magazine 128 is supported from the under surface of a projection of the bed 31 by a bracket 129. Reel 125 is driven by a pulley 130 on shaft 126, deriving its rotation from a pulley 131 (Fig. 1) through a continuous flexible belt 132. The pulley 131 is suitably connected in the usual manner to the film driving mechanism in the projector.

The film F enters the take-up magizine 128 through a fire trap comprising two pairs of wringer or guide rollers 133, 133', 134 and 134'. The upper pair of rollers 133 and 133' are rotatably supported on pins carried on a bracket 135 (Fig. 9) mounted on the bed 31. The lower rollers 134 and 134' are rotatably mounted on pins extending from the wall of the magazine 128. The outer end of each pair of wringer rollers are free to permit the film to be passed transversely therebetween when threaded.

Figure 10:
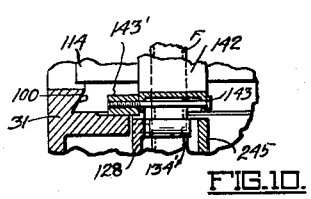
Fig. 10 is a fragmentary, sectional view taken along the line 10—10 of Fig. 5.

The film is drawn through the picture gate 113 of the projector by means of a pull down mechanism generally indicated at 137 (Fig. 5). Pull down mechanism 137 is preferably of the type employing pilot or register pins to permit accurate and steady registration of the film F while it is intermittently held stationary in the film gate 113. From the pull down mechanism 137 the film is passed around a hold back sprocket 138, over a guide roller 139, and thence between the two upper wringer rollers 133 and 133' of the take-up magazine fire trap. Roller 139 is rotatably mounted in the body of the projector and extends through an opening 140 in the rear wall 141 of the projector thus guiding the film F from the projector to its take-up magazine in all focused positions thereof. A channel shaped cover member 142 is provided to protect the film passing between the roller 139 and the magazine 128. Cover 142 is pivoted on a pin 142 (Fig. 10) projecting from a bracket 143' suitably secured on the base of the guideway 100 and is adapted to be swung outward to permit threading or inspection of the film. Due to the action of gravity cover 142 follows the rear wall 141 of the projector in all adjusted positions thereof. A door 245 hinged at 246 to the magazine 128 permits access to the take-up reel 125.

An arc light (not shown) is supported in a conventional type of lamp house 144 (Fig. 1) for illuminating the film in projector 10 to project an image thereof to the screen. Lamp house 144 is adjustably supported on a downwardly inclined arm 145 secured intermediate its length to a bracket 146 which, in turn, is secured to the side of the pedestal 32. Arm 145 is also supported by track 159 as described later. An adjustment generally indicated at 147 is provided to move the lamp house 144 longitudinally thereof to correctly position the same for different focusing positions of the projector 10.

Arm 145 has a hollow skirt 157 formed at the bottom thereof in which is rotatably mounted a pair of rollers, one of which is shown at 158. Rollers 158 ride along a track 159 integrally formed on the main base 51 to assist in supporting the lamp house 144. Track 159 extends concentric with the axis of rotation of pedestal 32.

The arc light for the projector 11 is provided in a lamp house 160, which is supported for longitudinal adjustment as generally indicated at 161, the same as the longitudinal adjustment for the lamp house 144. Lamp house 160 is supported on the top of an arm 162 secured intermediate its length to a bracket 163 which, in turn, is secured to the side of pedestal 32, opposite the point where bracket 146 is secured thereto. Arm 162 also has rollers, one of which is shown at 165, rotatably mounted in an enlarged skirt 166 therein for movement along the circular track 159.

It is to be noted that the lamp houses 144 and 160, although movable about a vertical axis through the center of pedestal 32 in fixed relation with their respective projectors, are not rotatable about a horizontal axis with those projectors when hand wheel 48 is manipulated to tilt the projectors.

A lamp house 167, similar to those of 144 and 160, carrying an arc light is provided for the projector 12. Lamp house 167 is supported on a curved arm 168, concentric with the aligned optical axes of the projectors 10 and 11, through longitudinal adjustment 169 similar to that provided for lamp houses 144 and 160. Arm 168 (Figs. 2, 3 and 4) is substantially square in cross section and has raised bearing portions 170 at either corner thereof. Arm 168 is slidable within a curved bearing member 171. Member 171 comprises in cross section a U-shaped casting 179 having a cover plate 172 secured thereto by screws 173 to enclose the arm 168. Bearing member 171 is supported in part by a bracket 174 secured thereto and to the pedestal 32 intermediate the points where brackets 146 and 163 are connected. Member 171 is also supported from a track 175 by a tubular framework 176 on the lower end of which is mounted a pair of rollers 177 and 178 movable along the track 175. Track 175 is concentric with track 159 and may be inset in the floor as shown in Figs. 2 and 3. Framework 176 comprises a pair of spaced vertically extending tubular posts 247 and 248 attached at their upper ends to either side of the bearing member 171 and terminating at their lower ends in a hollow skirt 249 in which are mounted the rollers 177 and 178.

Means are provided to move the lamp house 167 in a curved path to align the same with the projector 12 for different positions thereof about the horizontal tilt axis of the projector unit. To accomplish this a curved gear rack 180 is integrally formed along a portion of the arm 168. A gear 181 meshes with the rack 180 and is carried on an axle 182 journalled within bearings 183 and 184 formed in a gear casing 185. Gear casing 185 is secured to the outer flange 186 of the bearing member 171 by bolts 187 and encloses an aperture 186' formed in the flange 186 to permit the gear 181 to mesh with rack 180. A worm 188 meshes with the gear 181 and has the shaft 189 thereof journalled within bearings 190 and 191 also formed in the gear casing 185. A hand wheel 192 is provided on the shaft 189 to permit manual rotation of the worm 188 to adjust the lamp house 167 about the horizontal tilt axis of the projector unit.

In operation, the various elements of the projector apparatus are adjusted as follows: The rear projector 12 is first illuminated to project a beam of light therefrom onto the screen. The projector base 31 is then panned and tilted by means of the hand wheels 66 and 48, respectively, until the beam of light is centrally located on the screen. This panning movement of base 31 has served to move all the lamps with their respective projectors as the projectors and their lamp houses are moved about a vertical axis when pedestal 32 is rotated by hand wheel 66. However, hand wheel 48 tilts all the projectors without tilting any of their respective lamp houses and lamp house 167 is the only one which must be given a corrected tilt adjustment (by hand wheel 192) when the projectors are tilted. With the construction shown, there is no necessity for a tilt adjustment of lamp houses 144 and 160 when all the projectors are tilted, as the tilt movement is about an axis passing through optical axis of lamp houses 144, 160 and their projectors. The hand wheel 192 is rotated until the lamp house 167 assumes the correct position relative to the projector 12, that is, until the arc light therein is aligned with the optical axis of the objective lens of projector 12. The arcs for the projectors 10 and 11 are then lit to project their respective beams onto the screen. The mirrors 13 and 14 are then adjusted roughly to register the two beams from projectors 10 and 11 with the beam from projector 12.

If the picture scene is to be projected in black and white, three identical positive prints from the same negative of the scene are prepared and are threaded in the three projectors. However, if the scene is to be projected in color according to the additive process, three positive prints are respectively prepared from three color separation negatives of different color aspects of the scene (assuming a three color process is employed) and are threaded in the three projectors. Again, if the scene is to be projected in color according to the subtractive process, three identical and natural colored prints of the same color negative or set of color negatives of the scene are prepared and threaded in the three projectors. The three positive prints regardless of how they are obtained, are provided with synchronized starting marks by which they may all be started in the same relative positions in the projectors.

In any of the above cases, after the three projectors are properly threaded, they are successively illuminated and focused by the hand wheels 112 until the projected image from each is sharp on the screen. In the final adjustment all three projectors are illuminated and the mirrors 13 and 14 are minutely adjusted to obtain exact registration of the three light beams on the screen.

The use of the invention in conjunction with the projection of ordinary black and white silver image films or dyed silver image films results in a large reduction of projected silver grain pattern. This pattern is due to the clustering of the minute silver grains in the film emulsions. Since the arrangement of the silver grain pattern in different films or different portions of the same film is, of course, different, the superposition of several identical and registered projected film images on a screen will result in the projected minute voids or openings caused by the clustering of grains in one film emulsion being filled by the projected images of the minute clustered grains themselves in another film emulsion.

Due to the above noted reduction of grain pattern the details and clearness of the projected picture will be materially increased. Also, due to the reduction of the minute voids in the projected pictures which are caused by the clustering of silver grains in the film emulsion, the shadows or darkened portions of the projected pictures will be rendered darker resulting in a greater contrast value between highlights and shadows. This increase in contrast value reduces the washed-out appearance noted in projected background type of composite pictures.

The provision for tilting the projector unit about an axis passing through the centers of the angularly positioned mirrors has the advantage that the lengths of the optical paths between the films in the various projectors and the projection screen all remain the same for different tilted positions of the projector unit, and therefore the registration of the three projected images from the three projectors remains undisturbed. This feature remains the same regardless of the relative positions of the projectors. That is, if the projectors 10 and 11 were positioned midway between their illustrated positions and the projector 12 (or in any other position) while the mirrors 13 and 14 were adjusted to register the various superimposed projected images, this registration of the various images would remain undisturbed provided that the projector unit was tilted about the axis passing through the centers of the mirrors 13 and 14.

The importance of the above feature is recognized by the fact that a movement of the order of one inch of the projector unit toward or away from the projection screen will result in the registration of the superimposed projected images from the three projectors becoming noticeably disturbed.

In order to correctly adjust the position of the lamp house 167 for various tilted positions of the projector 12 on bed 31, corresponding scales may be provided on the leg 6 of saddle 34 and on the curved arm 168 supporting lamp house 167 to bring these members into alignment.

I claim:

1. Projection apparatus comprising the combination of a picture gate, film traversing means therefor, a housing for said gate and said means, an objective lens, means independent of said housing for supporting said lens, adjusting means for moving said housing about an axis through said gate, and means for moving said casing toward and away from said lens.

2. Projection apparatus comprising a support, a slide thereon, an adjusting screw for reciprocating said slide, a film projector casing on said slide, said casing having a picture gate fixed therein, means supporting said casing on said slide for pivotal movement about an axis through said gate, and an adjusting screw on said slide for effecting said pivotal movement.

3. Projector apparatus comprising the combination of a bed, an objective lens mount, means for supporting said lens mount in fixed relation to said bed, a slide on said bed movable towards and away from said lens mount, means for operating said slide, means for supporting a projector casing in operative relation to said lens mount comprising a pad on said slide, a pivotal connection between said pad and said slide for pivoting said pad about an axis transversely of the axis of said lens mount, and means on said slide for pivotally adjusting said pad.

4. Projector apparatus according to claim 3 comprising a lens tube in said lens mount, a projector casing having a front wall with an aperture therein to receive one end of said lens tube, said projector casing having a film movement and a film gate therein, and means for securing said casing to said pad with said film gate in alignment with said pivotal connection.

BYRON C. HASKIN.